Patented July 16, 1935

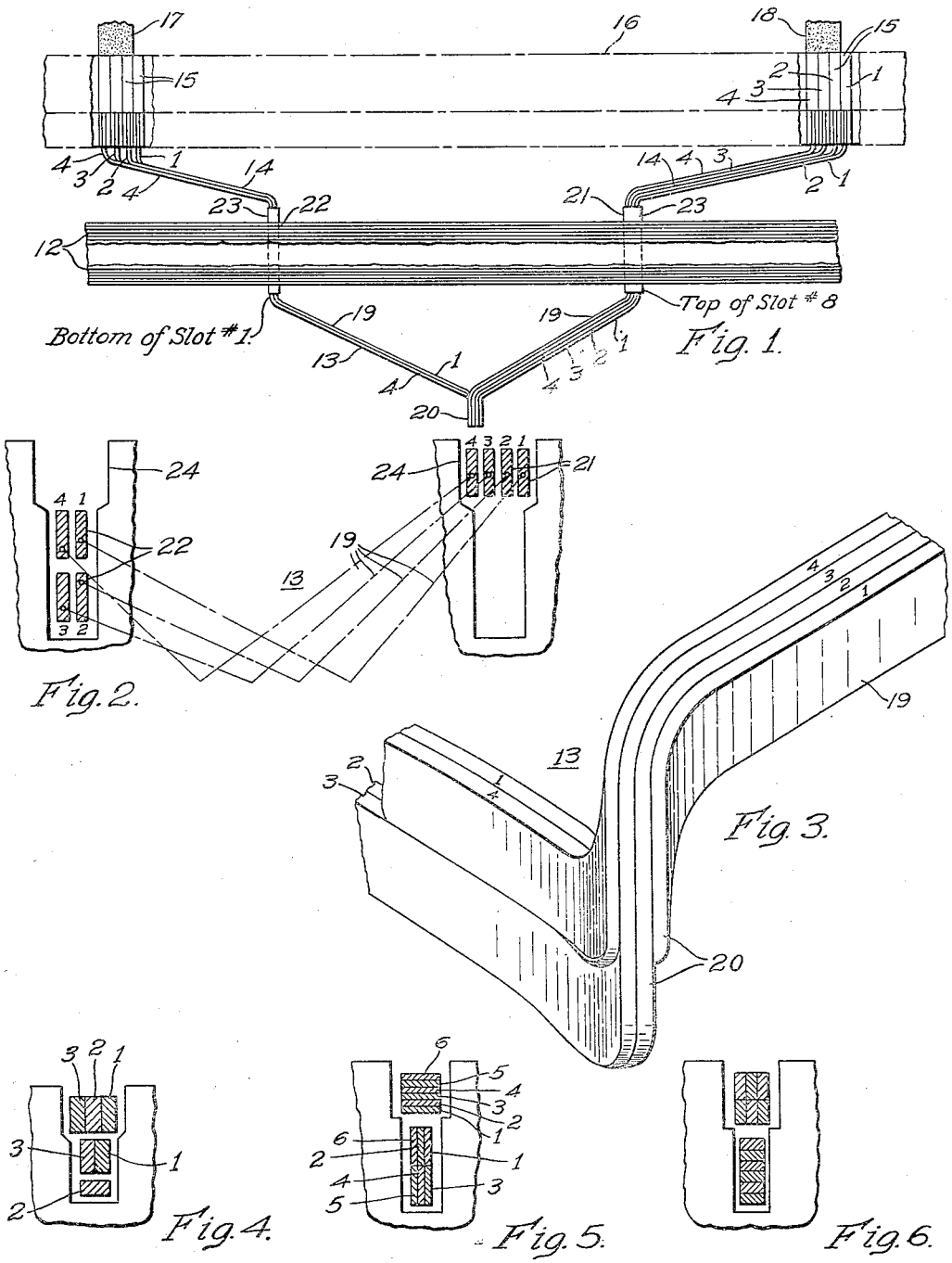

2,008,451

UNITED STATES PATENT OFFICE 2,008,451

ARMATURE COIL

Charles F. Jenkins, Wilkinsburg, Pa., assignor to Westinghouse Electric & Manufacturing Company, East Pittsburgh, Pa., a corporation of Pennsylvania Application November 11, 1933, Serial No. 697,638

20 Claims. (Cl. 171—206)

My invention relates to armature coils and it has particular relation to such coils for direct-current railway motors, although it is not limited to any particular application.

In direct-current railway-motor design, it is being found that the limit in the output or rating of the motors is determined in many cases by the commutation or life of the commutator and brushes. It is well known that when commutation is poor, the commutator surface becomes roughened, and when commutation is good, the surface of the commutator takes on a polish under the action of the brushes. If the balance between the polishing action of the brushes and the roughening action of sparking due to poor commutating conditions is overstepped, the commutator ceases to operate with a bright polished surface, resulting in unsatisfactory operating conditions involving frequent maintenance operations and a short life of commutator and brushes.

In direct-current railway motors having a plurality of coils per slot, particularly with reference to motors utilizing one-turn armature-coils having integral or one-piece coils made from copper strap without resorting to the welding together of two or more strap conductors at the ends, in order to make one complete coil, it has invariably been the practice to dispose the coil-sides in the natural order in which they would come, with the result that one of the end coils, of the group of coils which lie half in the bottom of one slot and half in the top of another slot, will have its bottom coil-side disposed in the very bottom of the slot in which it lies. This has resulted in poor commutating conditions when the direction of rotation is such that this coil is the last one of the group to leave the commutator brush. This is because, when the group of coils in any pair of slots are being commutated, all of the short-circuited coils, on leaving the brush and thus becoming open-circuited, can transfer their energy by induction to another short-circuited coil or coils in the same slots, the coupling being close because of the juxtaposition of the coils in the same slots. The last coil has no closely coupled short-circuited coil to which it can transfer its energy, with the result that this energy must be dissipated in a spark at the commutator, and if this last coil has one of its coil-sides at the bottom of a slot, it will be in a position to have the maximum reactance of all of the coil-sides in that slot, thus producing the maximum sparking.

An object of my invention is, therefore, to produce a commutator-type dynamo-electric machine having such disposition of the coil-sides, in a machine of the type just described, that the last coil to be commutated, in a group of a plurality of coils lying in a given pair of slots, shall not have one of its coil-sides in the bottom of the slot, for either direction of rotation.

A further object of my invention is to accomplish the foregoing result in a stepped-slot armature, such as that which is illustrated in my Patent No. 1,916,374, patented July 4, 1933.

The stepped-slot design of my patent just mentioned is somewhat restricted in its scope to a design in which the bottom portions of the slots are approximately half as wide as the top portions thereof.

A further object of my present invention is to provide a stepped-slot armature of the integral stepped-coil type in which the strap conductor is twisted or rotated through 90° in passing from the top of one slot to the bottom of another, so that there is no fixed relation beween the widths of the top and bottom portions of the stepped slot, thus making it possible for the designer to change these dimensions, to suit the conditions of design, by the simple expedient of changing the shape of the cross-section of the copper strap.

With the foregoing and other objects in view, my invention consists in the apparatus, structure and combinations hereinafter described and claimed and illustrated in the accompanying drawing, wherein:

Figure 1 is a diagrammatic development view showing the arrangement of the end-connections and commutator-bars of a dynamo-electric machine embodying my invention;

Fig. 2 is a diagrammatic transverse sectional view through an armature shown in Fig. 1, with the rear end-connections shown diagrammatically;

Fig. 3 is a perspective view of the rear end-connections of Figs. 1 and 2;

Fig. 4 is a cross-sectional view showing the disposition of the armature conductors in a slot in a slightly different embodiment of my invention; and Figs. 5 and 6 are similar views showing still further modifications.

As shown in Figs. 1, 2 and 3, my invention is applied to a commutator-type dynamo-electric machine, which may be a reversible direct-current motor, comprising a slotted laminated armature core 12 having an armature winding 13 thereon, only a few coils of the armature winding being shown, for convenience in illustration. The front ends 14 of the armature-winding conductors are connected to the commutator-bars 15 of a commutator 16, which is engaged by brushes 17 and 18 for carrying the current to or from the commutator. The armature winding 13 has rear end-connections 19 which are special, in accordance with my invention.

The particular armature winding shown is made from strap-conductors. The winding, as shown in Figs. 1, 2 and 3, is composed of a plurality of single-turn coils per slot. In Figs. 1, 2 and 3, there are four coils per slot. It will be noted that the entire winding is made up of straight coil-sides, which lie in the slots, and front and rear end-connections 14 and 19. Half of the coil-sides lie in the top portions of the slots and are designated as "top coil-sides" 21, and half of the coil-sides lie in the bottom portions and are designated as "bottom coil-sides" 22. These two groups of coil-sides are usually wrapped together with special ground insulation, as indicated in Fig. 1 at 23, which also considerably facilitates the handling of the coils in assembling the armature.

The armature core is preferably provided with slots that are stepped, as indicated at 24 in Fig. 2, the top half of the slot being wider and shallower than the bottom half, so as to provide a greater section between the roots of the teeth between the slots, as pointed out in my aforementioned patent.

In common with the construction shown in my above-mentioned patent, the embodiment of my invention in Figs. 1, 2 and 3 utilizes a construction in which there are twice as many top coil-sides 21 in side-by-side relation, that is, in a row, counting from side to side, in the top portion of each slot as there are bottom coil-sides 22 in side-by-side relation in the bottom portion of each slot, and twice as many bottom coil-sides 22 in superposed relation, that is, in a file, counting from top to bottom, in the bottom portion of each slot as there are top coil-sides 21 in superposed relation in the top portion of each slot.

In the embodiment of my invention shown in Figs. 1, 2 and 3, there are four top coil-sides 21, numbered 1, 2, 3 and 4 to distinguish them, all disposed in a row, counting from side to side, in the top portion of each slot. The front end-connections 14 of these four coil-sides go to four successive commutator-bars 15, which are numbered 1, 2, 3 and 4 in order to distinguish them from each other.

The rear end-connections 13 and 19 are arranged with a loop 20 which is devised, as shown more clearly in Fig. 3; namely, so that the first and last strap-conductors, numbered 1 and 4, respectively, if considered as coming from the top coil-sides, come out side-by-side on top; the other two strap-conductors 2 and 3, if also considered as coming from the top coil-sides, come out below 1 and 4; and all four conductors continue on into the bottom coil-sides 22 disposed in another slot, as indicated in Figs. 1 and 2, so that the disposition of the coil-sides in the bottom halves of the slot are two abreast and two deep.

It will be observed, with the foregoing arrangement in Figs. 1, 2 and 3, that as the brushes 17 and 18 leave the last coil of the group of four coils in each pair of slots, thus open-circuiting the coil, it will open-circuit either coil number 1 or coil number 4, according to the direction of rotation, and the design is such that the bottom coil-sides of both of these coils are disposed as far from the bottom of the slot 24 as possible, so as to reduce the reactance of these coils which commutate last and thus have the most sparking.

My invention is particularly applicable to an integral coil construction in which the armature winding is made up of a plurality of one-piece units or coils, each made from a single integral piece of strap-conductor, and each comprising a top coil-side in one slot and a bottom coil-side in another slot, and the end-connections therefor, as illustrated in Figs. 1 and 3. In order that the coils may all be exactly alike, such a construction usually utilizes a plan in which the four bottom coil-sides, numbered 1 to 4, are all together in a single slot instead of having the bottom coil-side 1 or 4 in the bottom of another slot, as is sometimes practiced in split-throw windings of the type covered by a Hellmund Patent No. 1,298,705, patented April 1, 1919. My invention is obviously not limited, in its broadest aspects, in either one of these two particulars, that is, integral construction, or constant-pitch coils.

It will be observed that if the two bottom coil-sides, numbered 1 and 4, or 1 and $n$, if there are $n$ coils per slot instead of four, are to be disposed away from the bottom of the slot, as just described, there must be more than two coils per slot, so that there will be at least one other bottom coil-side which can be disposed underneath the bottom coil-sides numbered 1 and $n$, respectively.

Fig. 4 illustrates the way the invention would be arranged where $n$ is equal to three, the coil-sides being numbered consecutively 1, 2 and 3 in the manner explained in connection with Figs. 1 to 3.

It will be noted that the embodiment of my present invention, as shown in Figs. 1, 2 and 3, is limited to a stepped-slot shape in which the bottom half of the slot is approximately one-half as wide and twice as deep as the top half, the slight departure from an exact approximation of these dimensions being due to the presence of the ground insulation and whatever slot liner is utilized. In order to avoid this design limitation, I have devised the winding arrangements shown in Figs. 5 and 6.

One essential feature of the invention shown in Figs. 5 and 6 is that the rear end-connections of the conductors are so arranged that the conductors are rotated or twisted through 90°, so that the strap-conductor lies flatwise in the top half of each slot and edgewise in the bottom of each slot, as shown in Fig. 5, or vice versa, as shown in Fig. 6. Another essential of this winding is that there are twice as many conductors in depth, or in superposed relation, in the top half of each slot as there are conductors in width, or in side-by-side relation, in the bottom half, and twice as many conductors in depth in the bottom half as there are conductors in width in the top half.

This arrangement, as shown in Figs. 5 and 6, has the advantage over that shown in Figs. 1 to 3 in that there is no fixed relation between the widths of the top and bottom halves of the slot, so that these dimensions can be changed to suit the conditions of design by changing the length and breadth of the rectangular cross-section of the strap conductors. In general, a flat strap-conductor will be utilized, in the designs of the type shown in Figs. 5 and 6, rather than a square-sectioned strap-conductor.

In the above description of the embodiments of my invention shown in Figs. 5 and 6, the word "twice" could be replaced by "thrice" or, in general, by "$m$ times", where $m$ is any integer greater than 1, which would result in a possible arrangement where very deep slots are required.

In Fig. 5, there are six one-turn coils per slot, the successive coils being numbered from 1 to 6. In other words, $n$ is here equal to six, and it will be observed that the bottom coil-sides of the first and last coil in each group, numbered 1 and 6, respectively, are both in the top rank of the two ranks of coil-sides which are disposed in the bottom half of the slot, so that these coil-sides will have as little reactance as possible, for the reason already explained.

While I have illustrated my invention in several forms of embodiment, it will be obvious that I am not limited thereto, and that changes and substitutions may be made by those skilled in the art without departing from the essential features of my invention. I desire, therefore, that the appended claims shall be accorded the broadest construction consistent with their language and the prior art.

I claim as my invention:

1. A commutator-type dynamo-electric machine having a slotted armature-core and an armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, a group of $n$ top coil-sides in any given slot being connected to $n$ consecutive commutator-bars and being electrically continuous, respectively, with a corresponding group of bottom coil-sides all lying in the bottom half of another given slot, characterized by the two bottom coil-sides which correspond to the first and $n$th coil-sides of said group of $n$ top-coil sides being disposed in the top portion of the bottom half of said second-mentioned slot, with another bottom coil-side or sides disposed underneath said two bottom coil-sides.

2. A commutator-type dynamo-electric machine having a stepped-slot armature core and an armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, the bottom halves of the slots being deeper and narrower than the top halves of the slots, a group of $n$ top coil-sides in any given slot being connected to $n$ consecutive commutator-bars and being electrically continuous, respectively, with a corresponding group of bottom coil-sides all lying in the bottom half of another given slot, characterized by the two bottom coil-sides which correspond to the first and $n$th coil-sides of said group of $n$ top-coil sides being disposed in the top portion of the bottom half of said second-mentioned slot, with another bottom coil-side or sides disposed underneath said two bottom coil-sides.

3. A commutator-type dynamo-electric machine having a slotted armature-core and a strap-conductor armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, said armature-winding comprising a plurality of one-piece units each made from a single integral piece of strap-conductor and each comprising a top-coil side in one slot and a bottom coil-side in another slot and the end-connections therefor, the bottom coil-sides in any slot being disposed in a plurality of superposed ranks, a group of $n$ top coil-sides in any given slot being connected to $n$ consecutive commutator-bars, the bottom coil-sides corresponding to both the first and $n$th of these $n$ top coil-sides being disposed in a rank or ranks other than the bottom rank.

4. A commutator-type dynamo-electric machine having a stepped-slot armature core and a strap-conductor armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, the bottom halves of the slots being deeper and narrower than the top halves of the slots, said armature-winding comprising a plurality of one-piece units each made from a single integral piece of strap-conductor and each comprising a top-coil side in one slot and a bottom coil-side in another slot and the end-connections therefor, the bottom coil-sides in any slot being disposed in a plurality of superposed ranks, a group of $n$ top coil-sides in any given slot being connected to $n$ consecutive commutator-bars, the bottom coil-sides corresponding to both the first and $n$th of these $n$ top coil-sides being disposed in a rank or ranks other than the bottom rank.

5. A commutator-type dynamo-electric machine having an armature comprising a core having stepped slots the top portion of the slots being approximately twice as wide and half as deep as the bottom portion, and an armature-winding having $n$ coils per slot, $n$ being greater than two, half of the coil-sides, hereinafter called "top coil-sides", being disposed in the top portions of the slots, and the other half of the coil-sides, hereinafter called "bottom coil-sides", being disposed in the bottom portions of the slots, characterized by an even number of coil-sides lying in each portion of each slot, there being twice as many coil-sides in a row, counting from side to side, in the top portion of each slot as in the bottom portion of each slot, and twice as many coil-sides in a file, counting from top to bottom, in the bottom portion of each slot as in the top portion of each slot, the bottom coil-sides in any slot being disposed in a plurality of superposed ranks, a group of $n$ top coil-sides in any given slot being connected to $n$ consecutive commutator-bars, the bottom coil-sides corresponding to both the first and $n$th of these $n$ top coil-sides being disposed in a rank or ranks other than the bottom rank.

6. A commutator-type dynamo-electric machine having a stepped-slot armature core and an armature-winding having $n$ one-turn coils per slot, $n$ being an even number greater than two, each coil comprising a single top coil-side lying in the top portion of one slot and a single bottom coil-side lying in the bottom portion of another slot, characterized by an even number of coil-sides lying in each portion of each slot, there being twice as many coil-sides in a row, counting from side to side, in the top portion of each slot as in the bottom portion of each slot, and twice as many coil-sides in a file, counting from top to bottom, in the bottom portions of each slot as in the top portion of each slot, the bottom coil-sides in any slot being disposed in a plurality of superposed ranks, the $n$ top coil-sides in any given slot being connected to $n$ consecutive commutator-bars, the bottom coil-sides corresponding to both the first and $n$th of these $n$ top coil-sides being disposed in a rank or ranks other than the bottom rank.

7. A commutator-type dynamo-electric machine having a stepped-slot armature core and an armature-winding having $n$ one-turn coils per slot, $n$ being an even number greater than two, each coil comprising a single top coil-side lying in the top portion of one slot and a single bottom coil-side lying in the bottom portion of another slot, each slot having $n$ top coil-sides disposed in side-by-side relation and $n$ bottom coil-sides disposed in $n/2$ superposed ranks of two each, the $n$ top coil-sides in any given slot being connected to $n$ consecutive commutator-bars, the bottom coil-sides corresponding to both the first and $n$th of these $n$ top coil-sides being disposed in a rank or ranks other than the bottom rank.

8. A commutator-type dynamo-electric machine having a stepped-slot armature core and an armature-winding having four one-turn coils per slot, each coil comprising a single top coil-side lying in the top portion of one slot and a single bottom coil-side lying in the bottom portion of another slot, each slot having four top coil-sides disposed in side-by-side relation and four bottom coil-sides disposed in two superposed ranks of two each, the four top coil sides, in any given slot being connected to four consecutive commutator-bars, the bottom coil-sides corresponding to both the first and fourth of these four top coil-sides being disposed in the top rank of the bottom coil-sides.

9. A commutator-type dynamo-electric machine having a stepped-slot armature core and an armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, the top and bottom coil-sides being of flat strap-conductors lying flatwise in one half of each slot and edgewise in the other half, there being twice as many conductors in a file, counting from top to bottom, in the top half of each slot as there are conductors in a row, counting from side to side, in the bottom half, and twice as many conductors in a file, counting from top to bottom, in the bottom half as there are conductors in a row, counting from side to side, in the top half, a group of $n$ top coil-sides in any given slot being connected to $n$ consecutive commutator-bars and being electrically continuous, respectively, with a corresponding number of bottom coil-sides all lying in the bottom half of another given slot, characterized by the two bottom coil-sides which correspond to the first and $n$th coil-sides of said group of $n$ top coil-sides being disposed in the top portion of the bottom half of said second-mentioned slot, with another bottom coil-side or sides disposed underneath said two bottom coil-sides.

10. A commutator-type dynamo-electric machine having a stepped-slot armature core and an armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, said armature-winding comprising a plurality of one-piece units each made from a single integral piece of flat strap-conductor and each comprising a top-coil side in one slot and a bottom coil-side in another slot and the end-connections therefor, there being a 90° twist in the end-connections whereby the strap-conductors lie flatwise in one half of the respective slots and edgewise in the other half, there being twice as many conductors in a file, counting from top to bottom, in the top half of each slot as there are conductors in a row, counting from side to side, in the bottom half, and twice as many conductors in a file, counting from top to bottom, in the bottom half as there are conductors in a row, counting from side to side, in the top half, a group of $n$ top coil-sides in any given slot being connected to $n$ consecutive commutator-bars and being continuous, respectively, with a corresponding number of bottom coil-sides all lying in the bottom half of another given slot, characterized by the two bottom coil-sides which correspond to the first and $n$th coil-sides of said group of $n$ top-coil sides being disposed in the top portion of the bottom half of said second-mentioned slot, with another bottom coil-side or sides disposed underneath said two bottom coil-sides.

11. A commutator-type dynamo-electric machine having a stepped-slot armature core and an armature winding having $n$ one-turn coils per slot, $n$ being an even number greater than two, each coil comprising a single top coil-side lying in the top portion of one slot and a single bottom coil-side lying in the bottom portion of another slot, the top and bottom coil-sides being of flat strap-conductors lying flatwise in one half of each slot and edgewise in the other half, there being twice as many conductors in a file, counting from top to bottom, in the top half of each slot as there are conductors in a row, counting from side to side, in the bottom half, and twice as many conductors in a file, counting from top to bottom, in the bottom half as there are conductors in a row, counting from side to side, in the top half, a group of $n$ top coil-sides in any given slot being connected to $n$ consecutive commutator-bars and being electrically continuous, respectively, with a corresponding number of bottom coil-sides all lying in the bottom half of another given slot, characterized by the two bottom coil-sides which correspond to the first and $n$th coil-sides of said group of $n$ top coil-sides being disposed in the top portion of the bottom half of said second-mentioned slot, with another bottom coil-side or sides disposed underneath said two bottom coil-sides.

12. A commutator-type dynamo-electric machine having a stepped-slot armature core and an armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, the top and bottom coil-sides being of flat strap-conductors lying flatwise in one-half of each slot and edgewise in the other half, there being $m$ times as many conductors in a file, counting from top to bottom, in the top half of each slot as there are conductors in a row, counting from side to side, in the bottom half, and $m$ times as many conductors in a file, counting from top to bottom, in the bottom half as there are conductors in a row, counting from side to side, in the top half, $m$ being greater than unity, the bottom coil-sides in any slot being disposed in a plurality of superposed ranks, a group of $n$ top coil-sides in any given slot being connected to $n$ consecutive commutator-bars and being electrically continuous, respectively, with a corresponding number of bottom coil-sides, characterized by the two bottom coil-sides which correspond to the first and $n$th coil-sides of said group of $n$ top coil-sides being disposed in a rank or ranks other than the bottom rank.

13. A commutator-type dynamo-electric machine having a stepped-slot armature core and an armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, said armature-winding comprising a plurality of one-piece units each made from a single integral piece of flat strap-conductor and each comprising a top coil-side in one slot and a bottom coil-side in another slot and the end-connections therefor, there being a 90° twist in the end-connections whereby the strap-conductors lie flatwise in one half of the respective slots and edgewise in the other half, there being $m$ times as many conductors in a file, counting from top to bottom, in the top half of each slot as there are conductors in a row, counting from side to side, in the bottom half, and $m$ times as many conductors in a file, counting from top to bottom, in the bottom half as there are conductors in a row, counting from side to side, in the top half, $m$ being greater than unity, the bottom coil-sides in any slot being disposed in a plurality of superposed ranks, a group of $n$ top coil-sides in any given slot being connected to $n$ consecutive commutator bars and being continuous, respectively, with a corresponding number of bottom coil-sides, characterized by the two bottom coil-sides which correspond to the first and $n$th coil-sides of said group of $n$ top coil-sides being disposed in a rank or ranks other than the bottom rank.

14. A commutator-type dynamo-electric machine having a stepped-slot armature core and an armature-winding having $n$ one-turn coils per slot, $n$ being greater than two, each coil comprising a single top coil-side lying in the top portion of one slot and a single bottom coil-side lying in the bottom portion of another slot, the top and bottom coil-sides being of flat strap-conductors lying flatwise in one half of each slot and edgewise in the other half, there being $m$ times as many conductors in a file, counting from top to bottom, in the top half of each slot as there are conductors in a row, counting from side to side, in the bottom half, and $m$ times as many conductors in a file, counting from top to bottom, in the bottom half as there are conductors in a row, counting from side to side, in the top half, $m$ being greater than unity, the bottom coil-sides in any slot being disposed in a plurality of superposed ranks, a group of $n$ top coil-sides in any given slot being connected to $n$ consecutive commutator-bars and being electrically continuous, respectively, with a corresponding number of bottom coil-sides, characterized by the two bottom coil-sides which correspond to the first and $n$th coil-sides of said group of $n$ top coil-sides being disposed in a rank or ranks other than the bottom rank.

15. A dynamo-electric machine having a stepped-slot armature core and an armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, the top and bottom coil-sides being of flat strap-conductors lying flatwise in one half of each slot and edgewise in the other half, there being twice as many conductors in a file, counting from top to bottom, in the top half of each slot as there are conductors in a row, counting from side to side, in the bottom half, and twice as many conductors in a file, counting from top to bottom, in the bottom half as there are conductors in a row, counting from side to side, in the top half.

16. A dynamo-electric machine having a stepped-slot armature core and an armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, said armature-winding comprising a plurality of one-piece units each made from a single integral piece of flat strap-conductor and each comprising a top coil-side in one slot and a bottom coil-side in another slot and the end-connections therefor, there being a 90° twist in the end-connections whereby the strap-conductors lie flatwise in one half of the respective slots and edgewise in the other half, there being twice as many conductors in a file, counting from top to bottom, in the top half of each slot as there are conductors in a row, counting from side to side, in the bottom half, and twice as many conductors in a file, counting from top to bottom, in the bottom half as there are conductors in a row, counting from side to side, in the top half.

17. A dynamo-electric machine having a stepped-slot armature core and an armature-winding having $n$ one-turn coils per slot, $n$ being an even number greater than two, each coil comprising a single top coil-side lying in the top portion of one slot and a single bottom coil-side lying in the bottom portion of another slot, the top and bottom coil-sides being of flat strap-conductors lying flatwise in one half of each slot and edgewise in the other half, there being twice as many conductors in a file, counting from top to bottom, in the top half of each slot as there are conductors in a row, counting from side to side, in the bottom half, and twice as many conductors in a file, counting from top to bottom, in the bottom half as there are conductors in a row, counting from side to side, in the top half.

18. A dynamo-electric machine having a stepped-slot armature core and an armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, the top and bottom coil-sides being of flat strap-conductors lying flatwise in one half of each slot and edgewise in the other half, there being $m$ times as many conductors in a file, counting from top to bottom, in the top half of each slot as there are conductors in a row, counting from side to side, in the bottom half, and $m$ times as many conductors in a file, counting from top to bottom, in the bottom half as there are conductors in a row, counting from side to side, in the top half, $m$ being greater than unity.

19. A dynamo-electric machine having a stepped-slot armature core and an armature-winding having $n$ coils per slot, $n$ being greater than two, half of the coil-sides, hereinafter called "top coil-sides", being disposed in the top halves of the slots, and the other half of the coil-sides, hereinafter called "bottom coil-sides", being disposed in the bottom halves of the slots, said armature-winding comprising a plurality of one-piece units each made from a single integral piece of flat strap-conductor and each comprising a top coil-side in one slot and a bottom coil-side in another slot and the end-connections therefor, there being a 90° twist in the end-connections whereby the strap-conductors lie flatwise in one half of the respective slots and edgewise in the other half, there being $m$ times as many conductors in a file, counting from top to bottom, in the top half of each slot as there are conductors in a row, counting from side to side, in the bottom half, and $m$ times as many conductors in a file, counting from top to bottom, in the bottom half as there are conductors in a row, counting from side to side, in the top half; $m$ being greater than unity.

20. A dynamo-electric machine having a stepped-slot armature core and an armature-winding having $n$ one-turn coils per slot, $n$ being greater than two, each coil comprising a single top coil-side lying in the top portion of one slot and a single bottom coil-side lying in the bottom portion of another slot, the top and bottom coil-sides being of flat strap-conductors lying flatwise in one half of each slot and edgewise in the other half, there being $m$ times as many conductors in a file, counting from top to bottom, in the top half of each slot as there are conductors in a row, counting from side to side, in the bottom half, and $m$ times as many conductors in a file, counting from top to bottom, in the bottom half as there are conductors in a row, counting from side to side, in the top half, $m$ being greater than unity.

CHARLES F. JENKINS.